(12) United States Patent
Chaussee et al.

(10) Patent No.: US 12,316,973 B2
(45) Date of Patent: May 27, 2025

(54) METHOD TO USE 360-DEGREE CAMERAS

(71) Applicants: Matthew Chaussee, Fargo, ND (US); Katie Chaussee, Fargo, ND (US)

(72) Inventors: Matthew Chaussee, Fargo, ND (US); Katie Chaussee, Fargo, ND (US)

(73) Assignee: Be More Colorful, LLC, Fargo, ND (US)

( * ) Notice: Subject to any disclaimer, the term of this patent is extended or adjusted under 35 U.S.C. 154(b) by 0 days.

(21) Appl. No.: 17/854,223

(22) Filed: Jun. 30, 2022

(65) Prior Publication Data
US 2023/0188858 A1 Jun. 15, 2023

Related U.S. Application Data

(60) Provisional application No. 63/289,090, filed on Dec. 13, 2021.

(51) Int. Cl.
| | |
|---|---|
| *H04N 23/698* | (2023.01) |
| *H04N 13/194* | (2018.01) |
| *H04N 13/204* | (2018.01) |
| *H04N 23/90* | (2023.01) |

(52) U.S. Cl.
CPC ......... *H04N 23/698* (2023.01); *H04N 13/194* (2018.05); *H04N 13/204* (2018.05); *H04N 23/90* (2023.01)

(58) Field of Classification Search
None
See application file for complete search history.

(56) References Cited

U.S. PATENT DOCUMENTS

| | | | |
|---|---|---|---|
| 9,955,209 B2 | 4/2018 | Ng | |
| 10,321,109 B1 | 6/2019 | Tanumihardja | |
| 10,373,387 B1 | 8/2019 | Fields | |
| 10,440,329 B2 | 10/2019 | McCutchen | |
| 11,158,344 B1* | 10/2021 | Townsend | H04N 9/79 |
| 2009/0007202 A1* | 1/2009 | Williams | G06F 16/739 |
| | | | 725/105 |
| 2015/0117524 A1 | 4/2015 | Rondao Alface | |
| 2016/0006933 A1 | 1/2016 | Zimmerman | |
| 2016/0353089 A1 | 12/2016 | Gallup | |
| 2018/0005037 A1* | 1/2018 | Smith, IV | H04N 21/23439 |
| 2018/0061138 A1* | 3/2018 | Neeter | G06V 20/20 |
| 2018/0341811 A1* | 11/2018 | Bendale | G06V 20/70 |

(Continued)

*Primary Examiner* — Edemio Navas, Jr.
(74) *Attorney, Agent, or Firm* — Fargo Patent & Business Law; Thomas Kading; Joshua Krank

(57) ABSTRACT

The present invention disclosed herein provides for a unique method to use digital cameras with 360-degree capabilities to display an immersive experience to viewers. The method disclosed may comprise identifying a location, shooting a 360-degree photo, recording a 360-degree video, processing the images, compiling finished files to an interactive environment, and displaying the interactive environment to a viewer. Digital cameras with 360-degree capabilities have been used for both taking still photos and videos. Images taken in a 360 degree format may require additional processing to place into a format that is easily viewable by a user. Immersive environments are simulations that allow viewers to experience a sensation similar to that of being physically present. Virtual reality, augmented reality, interactive displays, and forms of art are various examples of immersive environments.

26 Claims, 5 Drawing Sheets

(56) References Cited

U.S. PATENT DOCUMENTS

2021/0021908 A1    1/2021  Phillips
2021/0082085 A1*  3/2021  Stimm ..................... G06T 7/13
2022/0100571 A1*  3/2022  Ohtsuka ........... G05B 19/41895
2022/0180491 A1*  6/2022  Shinohara ................ H04N 7/18

* cited by examiner

METHOD TO USE 360-DEGREE CAMERAS

CROSS-REFERENCE TO RELATED APPLICATION(S)

This application claims the priority and benefit to U.S. Provisional Patent Application No. 63/289,090, filed Dec. 13, 2021, the contents of which are hereby incorporated by reference in its entirety.

FIELD OF TECHNOLOGY

This disclosure generally relates to technology for 360-degree cameras.

BACKGROUND

Digital cameras have been used in various industries for many purposes. Digital cameras with 360-degree capabilities have increased in popularity in recent years. Digital cameras with 360-degree capabilities have been used for both taking still photos and videos.

Videos and photos are useful to convey information and to educate viewers. Videos and photos may be referred to as images. Images taken in a 360 degree format may require additional processing to place into a format that is easily viewable by a user. For example, 360 images may be processed as monoscopic or stereoscopic images depending on the final display.

Immersive environments are simulations that allow viewers to experience a sensation similar to that of being physically present. Virtual reality, augmented reality, interactive displays, and forms of art are various examples of immersive environments. Immersive environments have been used in educational settings. As digital camera technology and processing capabilities have improved, the demand for more detailed immersive environments has increased. Though 360 cameras are long existing technologies, the industry has not been able to develop methods to allow for the simultaneous use of 360-degree videos and photos in an immersive environment.

SUMMARY

The present invention disclosed herein provides for a unique method to use digital cameras with 360-degree capabilities to display an immersive experience to viewers. Methods to use both reframed videos and stitched photos in an immersive environment as disclosed herein have not been previously disclosed.

The method disclosed herein may comprise identifying a location, shooting a 360-degree photo, recording a 360-degree video, processing the images, compiling finished files to an interactive environment, and displaying the interactive environment to a viewer. To accomplish this method, an operator may physically identify a location and subsequently use one or more cameras to shoot a 360-degree photo and a 360-degree video from that location. In addition, a viewer may interact with the interactive environment that is displayed. The method disclosed herein allows an operator to use 360-degree cameras to shoot and record images at a location, such as communicating an interactive environment to a viewer. As a result, the viewer may experience a sensation similar to that of being physically present at the location.

To accomplish the disclosed method, both the shooting of photos and recording of videos are performed at the same location identified by the operator. Then, the images are uploaded for processing. Processing may include reframing and stitching the images into a format acceptable for displaying in the interactive environment. The interactive environment is processed to display a 360-degree photo upon which videos originating from the 360-degree videos recorded may be displayed. Viewers may interactively activate the videos that provide additional detail about the location to the viewers. Such videos need to be reframed from the 360-degree videos which have been recorded at the location. No known prior art has utilized a reframed 360-degree video which has been reframed to be displayed on an interactive environment displaying a 360-degree photo. Embedding a reframed video in an interactive environment including a stitched 360-degree photo is a novel and unique concept.

BRIEF DESCRIPTION OF THE DRAWINGS

These and other features and advantages of the present invention will become more readily appreciated as the same becomes better understood by reference to the following detailed description when considered in connection with accompanying drawings, wherein.

DETAILED DESCRIPTION OF THE ILLUSTRATED EMBODIMENTS

General

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

Figures Detail

Figure 1:
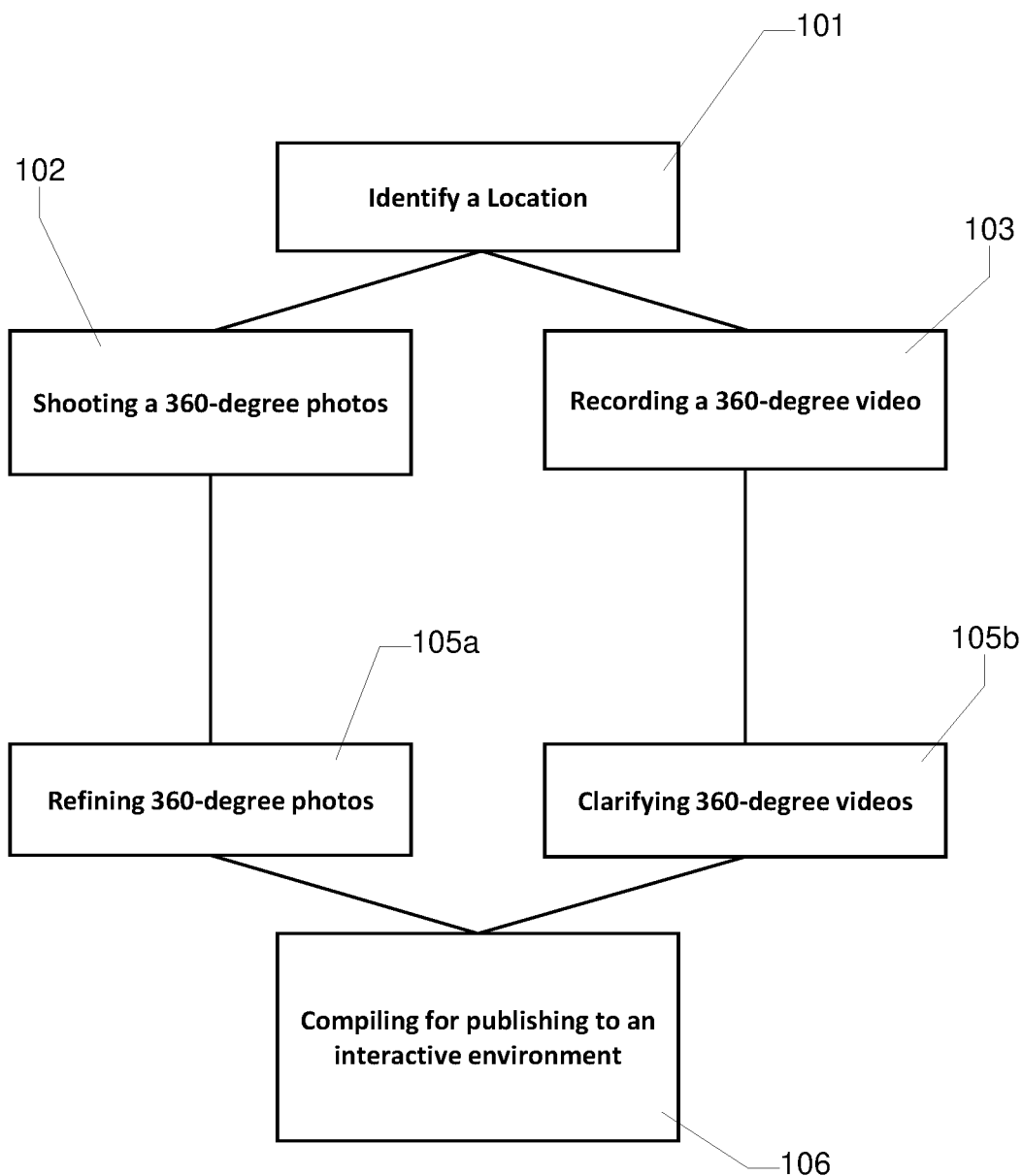
FIG. 1 is an exemplary block diagram for a method for using one or more 360-degree cameras to display an interactive environment to a viewer.

FIG. 1 is an exemplary block diagram for a method for using one or more 360-degree cameras to display an interactive environment to a viewer. This method may be referenced herein as a method to use a camera. The method disclosed herein may comprise identifying 101 a location, shooting 102 a 360-degree photo, recording 103 a 360-degree video, processing 105 finished files, and compiling 106 finished files to an interactive environment. The method may further comprise displaying the interactive environment to a viewer. The location may be at a place of work so that the interactive environment may communicate information about the place of work to a viewer. For example, the location may be at a factory or an office.

Figure 2:
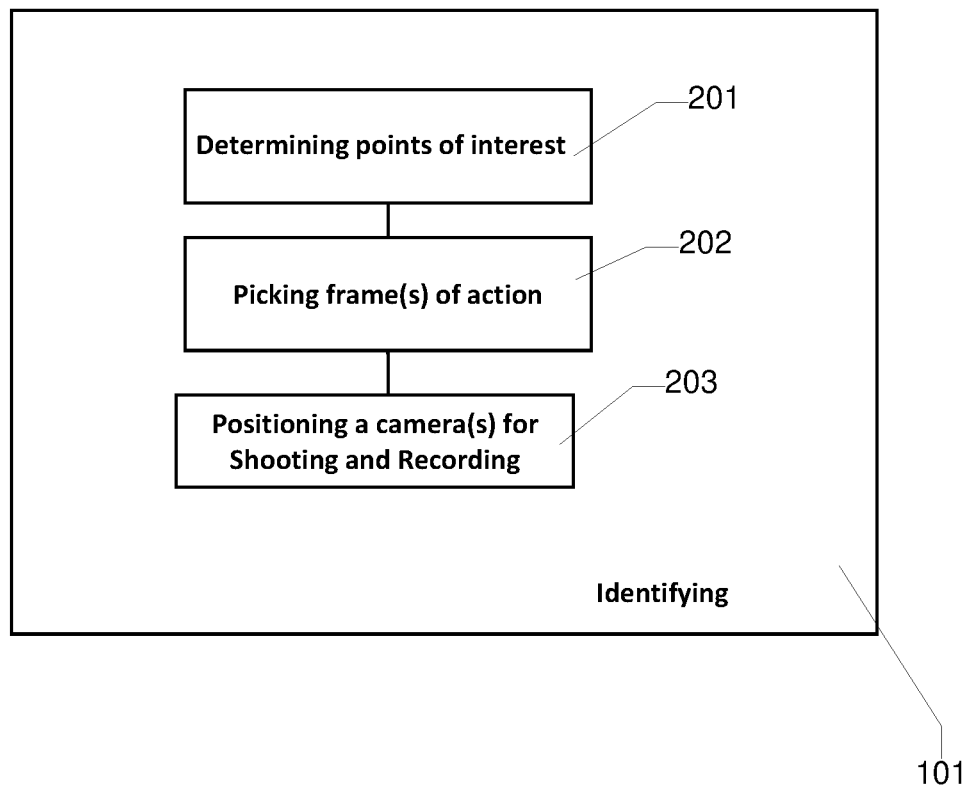
FIG. 2 is an exemplary block diagram showing the steps for identifying a location for recording a 360-degree video and shooting a 360-degree photo.

FIG. 2 is an exemplary block diagram showing the steps for identifying 101 a location for recording 103 a 360-degree video and shooting 102 a 360-degree photo. Shooting 102 may be the act of taking a 360-degree photo at a particular location. Recording 103 may be the act of taking a 360-degree video at a particular location.

Identifying 101 a location includes the step of determining 201 one or more points of interest and includes the step of picking 202 one or more frames of action. For example multiple frames of action An operator may identify the location. The operator is someone who may physically operate the one or more cameras. A first camera may be used for shooting the 360-degree photos of the point of interest and a second camera may be used for recording a 360-degree video of the frame of action. Alternatively, the first camera may be used for shooting both the 360-degree photos of the point of interest and used for recording a 360-degree video of the frame of action. A point of interest is an area that will ultimately be shot in a 360-degree photo. The point of interest may be where a viewer may interact to access additional information. A point of interest is identified as a hotspot by a user interacting with the interactive environment. Determining 201 a point of interest is the act of choosing where the 360-degree photo to be shot is located. Multiple points of interest may be chosen.

A hotspot or point of interest is a selectable space of content in the interactive environment. The point of interest is at a location that will be accessed by viewers in the interactive environment. The frame of action may provide a pop-out window or content beyond the point of interest. The frame of action may provide text, images, videos, or allows the viewer to learn more about a given part of the interactive environment. A frame of action may be used to provide more information about content communicated in the interactive environment. For example, additional information on the day-to-day items, tools, machinery, or environment a worker is inhabiting may be provided. Picking 202 is the act of choosing a frame of action to be provided in relation to the point of interest. The location may be identified such that the frame of action(s) and the point of interest may be captured by a camera. The point of interest is being shot as a 360-degree photo and the frame of action may be recorded as a 360-degree video.

For example, suppose the method to use a camera is configured for the purpose of providing a career experience to a viewer. In that case, the hotspots may help strengthen the viewer's understanding of what the job environment provides and what prerequisites the viewer may need to succeed in a given career field. The hotspots may also help build the environment with facts about the location, the company, and the developments or practices a company may value. The operator may determine the hotspots.

A frame of action is an area at the identified location, reflecting the spot on the 360-degree photo where a reframed video from a 360-degree video or other content may be displayed. A reframed video is a 360-degree video that has been processed to appear as a video with a standard aspect ratio. In the disclosed method to use a camera, a reframed video is one that originated from the 360-degree video recorded at the identified location. The operator may pick a frame of action.

A frame of action in an interactive environment provides a select area of focus for the viewer. For example, suppose the method to use a camera is configured for the purpose of providing a career experience to a viewer. In that case, the frame of action may be a worker, product, or device. The 360-degree capable camera may be positioned at the location where the environment may be accurately captured. This location can be interior or exterior, as well as static/non-static. Movement is welcome across the location, as the photo and video captured depict the full environment rather than a given space area. The frame of action also determines what the viewer will be witnessing from the depicted scene.

Once determining 201 the point of interest and picking 202 frames of action has been completed, the operator may take the action of positioning 203 cameras for shooting 102 and recording 103. Positioning 203 the cameras includes placing the one or more cameras at a specific spot at the location, which allows for an appropriate distance and height from points of interest and frames of action, ensuring uninterrupted first-person view.

The type of camera which could be used for the disclosed method to use a camera may be any 360-degree photo or video capture device. Typically such a device is a single device with multiple lenses allowing for everything from the camera's perspective to be captured. A 360-degree video capture device may be used to also shoot the 360-degree photo. A 360-degree video capture device may be a camera. A video capture device may carry out the shooting 102 step and the recording 103 step. For example, the video capture device may simultaneously perform both the shooting and recording functions. The video capture device in the example may be considered the first camera. A still-frame photo may be taken from the 360-degree video.

Figure 3:
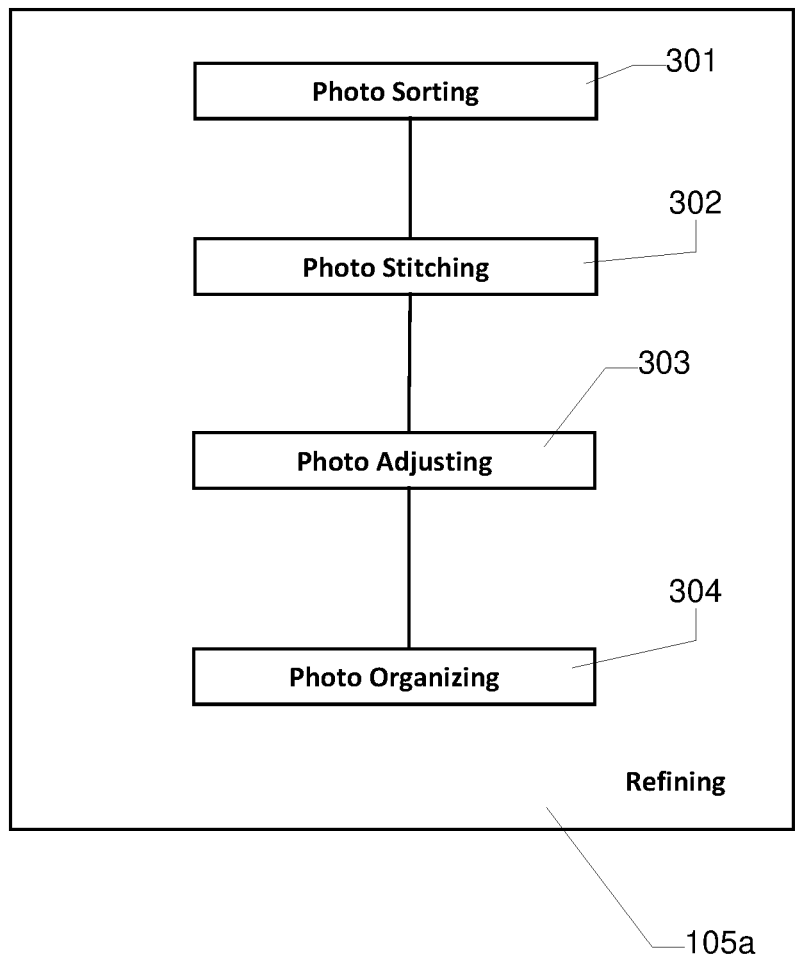
FIG. 3 is an exemplary block diagram showing the steps for processing a 360-degree photo shot at a location.

FIG. 3 is an exemplary block diagram showing the steps for refining 105a a 360-degree photo shot at a location. Processing 105 a 360-degree photo is considered refining 105a. Processing 105 a 360-degree video is considered clarifying 105b. Refining 105a and clarifying 105b may collectively be referenced to as processing 105.

Refining 105a comprises the steps of photo sorting 301 360-degree photos that are unstitched, photo stitching 302 the sorted and selected photos, and adjusting 303 the stitched photos. Refining 105a utilizes a photo sorting 301 function wherein 360-degree photos are systematically arranged to subsequently undergo photo stitching 302. Refining 105a may further comprise photo organizing 304 the stitched and adjusted photos into a storyboard sequence. Photo sorting 301 is the step of identifying which 360-degree photos or portions thereof will be used for subsequent display in the interactive environment. Multiple photos may have been shot at the location.

Photo stitching 302 is the step of combining 360-degree photos into a 360-degree equirectangular format. The derived result of photo stitching 302 is an equirectangular photo. The 360-degree photos may be shot such that the photos are stored or saved in multiple files or formats. Photo stitching 302 is the process of combining multiple photos into a panorama that may be viewable by a viewer in an interactive environment. There are many different software platforms upon which photos may undergo the photo stitching 302 step.

Refining 105a utilizes photo adjusting 303 wherein the equirectangular photo is edited for appearance. The equirectangular photo undergoes photo adjusting which may include editing for visual adjustments, color correction, stitching errors, sharpening and denoising. Many different software platforms upon which photos may undergo the photo adjusting 303 are publicly available. If photo organizing 304 is not required, photos that have been stitched and adjusted may be converted into a finished photo file. A finished photo file is one or more resulting files that will be compiled for display in the interactive environment.

Photo organizing 304 the stitched and adjusted photos into a storyboard sequence is a step that is relevant when multiple stitched and adjusted photos are to be used in the interactive environment. There are many different software platforms upon which photos may undergo the photo organizing 304 step.

Figure 4:
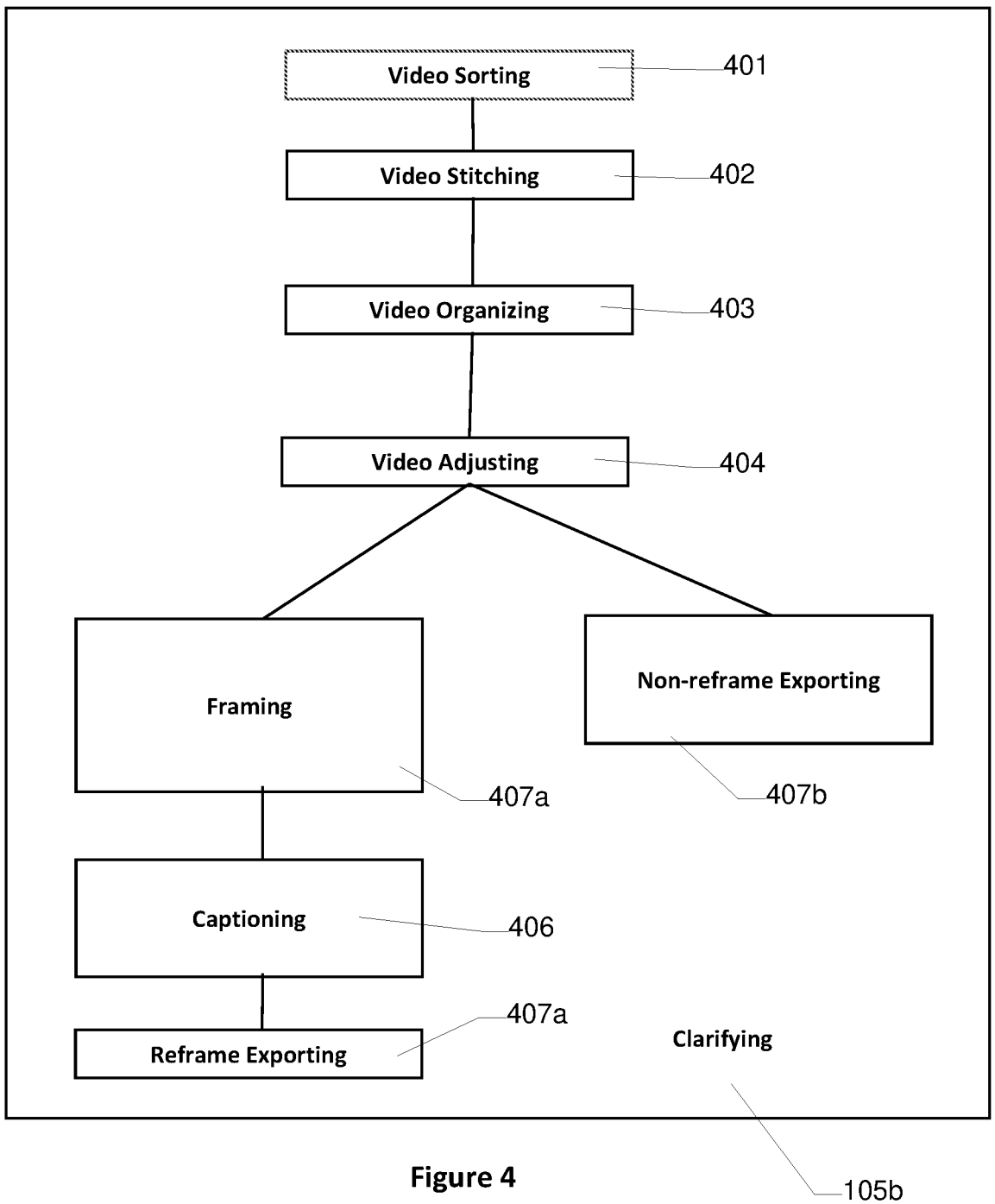
FIG. 4 is an exemplary block diagram showing the steps for processing a 360-degree video recorded at a location.

FIG. 4 is an exemplary block diagram showing the steps for processing 105 a 360-degree video recorded at a location. Processing 105 a 360-degree video is considered clarifying 105b. Clarifying 105b may include many of the same steps as refining 105a. Clarifying 105b may comprise of video sorting 401, video stitching 402, and video adjusting 404. The clarifying 105b step may further comprise any of the following steps: video organizing 403, framing 405, captioning 406, or exporting 407.

Video sorting 401 is the step of identifying which 360-degree videos or portions thereof, will be used for subsequent display in the interactive environment. Multiple 360-degree videos may have been shot at the location. Clarifying 105b utilizes a video sorting 401 function wherein 360-degree videos are systematically arranged to subsequently undergo video stitching 402.

Video stitching 402 is the step of combining 360-degree videos into a 360-degree equirectangular format. The derived result of video stitching 402 is an equirectangular video. The 360-degree videos may be recorded such that the videos are stored or saved in multiple files or formats. Video stitching 402 is the process of combining multiple videos into a panorama that may be viewable by a viewer in an interactive environment. There are many different software platforms upon which videos may undergo the video stitching 402 step.

Video adjusting 404 the stitched videos includes editing for visual adjustments, color correction, stitching errors, sharpening, denoising, and adding a voiceover. Many different software platforms upon which videos may undergo the video adjusting 404 are publicly available. If video organizing 403 is not required, videos that have been stitched and adjusted may be converted into a finished video file. A finished video file is one or more resulting files that will be compiled for display in the interactive environment.

Video organizing 403 multiple video stitched and video adjusted video into a storyboard sequence is a step that is relevant when multiple stitched and adjusted videos are to be used in the interactive environment. There are many different software platforms upon which videos may undergo the video organizing 403 step.

Framing 405 is a step wherein a stitched and adjusted video is reframed to a standard aspect ratio. Video resulting from framing 405 may be considered a reframed video. Framing is the process of manipulating the 360-degree video into a standard aspect ratio. The video resulting from the framing 405 step may be referenced as a reframed video. To reframe to a standard aspect ratio only a portion of the stitched and adjusted video is used. For example, one small portion of the 360-degree video may be reframed for display in the interactive environment. A portion of the 360-degree video may include the portion which includes a person speaking, a device, or other item which is desired to be displayed in an interactive environment. A standard aspect ratio may include, for example, a 16:9 or 4:3 ratio.

Captioning 406 is a step wherein captions are added to a video that has been reframed from a 360-degree video. For example, text could be added that provides a translation or text that provides additional information about what is being displayed in the reframed video. Captioning 406 is a step that is optional.

Exporting 407 is a step wherein the video is exported for display in an interactive environment. Exporting 407 may reference reframed exporting 407a or non-reframed exporting 407b. Exporting 407 may include exporting of finished files including both a finished video file and a finished photo file.

Reframed exporting 407a is the exporting of 360-degree video that has undergone video stitching 402, adjusting 404, framing 405, and optionally captioning 406. Multiple videos may be the result of reframed exporting 407a. For each frame of action there is the reframed exporting 407a step. For example, if there are four reframed videos in a particular interactive environment, the reframed exporting 407a step will occur four times.

Non-reframed exporting 407b is the exporting of 360-degree video that has undergone video stitching 402 and adjusting 404. The video exported in the non-reframed exporting 407b is not reframed video and is referenced as non-reframed video. Non-reframed video is the video exported in non-reframed exporting 407b. The 360-degree video that has not been reframed may be exported to the interactive environment to provide additional images for the interactive environment. For example, the 360-degree video that has not been reframed may be uploaded in an interactive environment displayed in a virtual reality device such as a headset. The 360-degree video that has not been reframed may provide for a supplementary experience to the interactive environment. A virtual reality device may be a simulation providing an experience to a viewer wherein the viewer has a seemingly real or physical experience with the video. Video that is non-reframed video undergoes non-reframed video uploading 501c.

Figure 5:
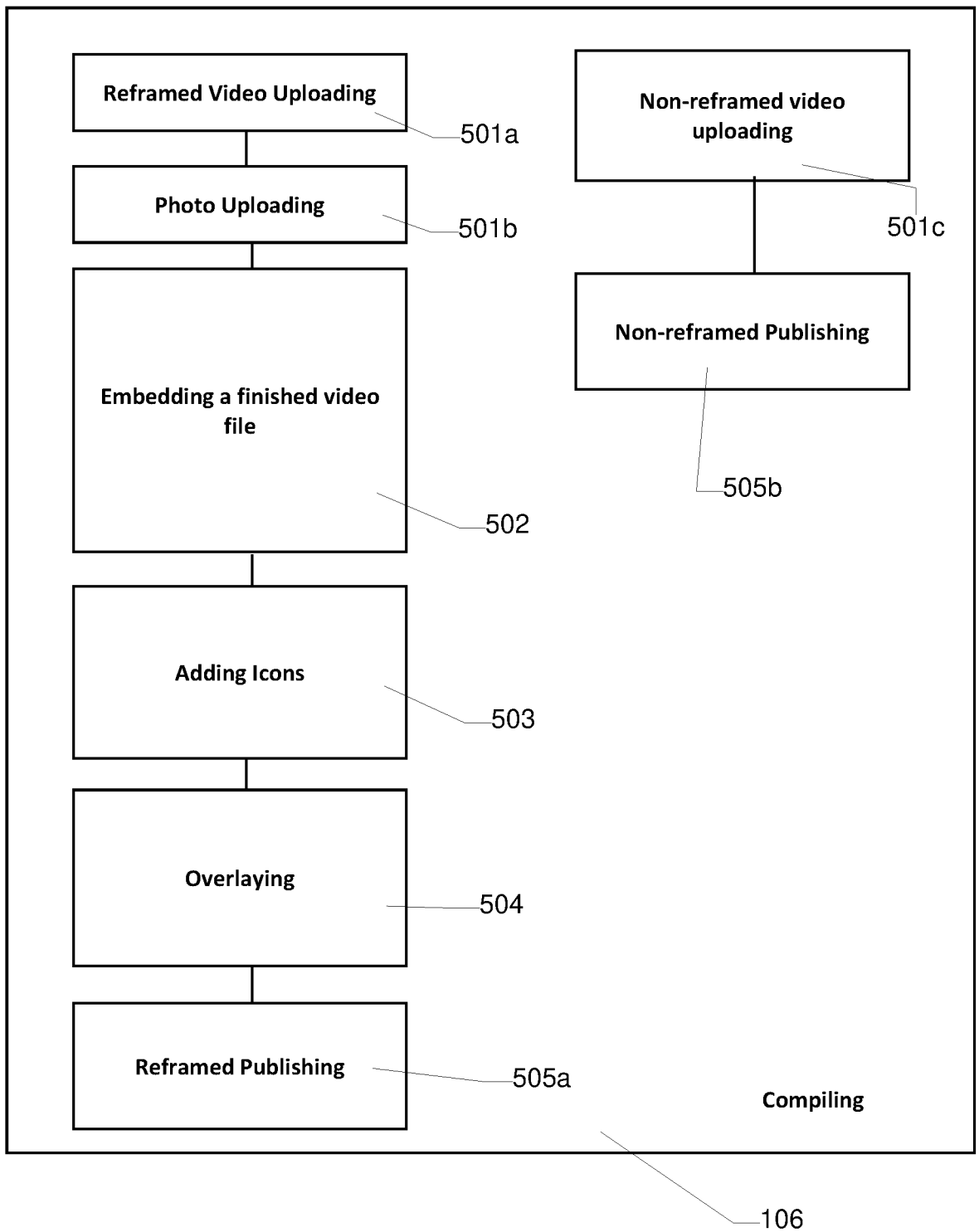
FIG. 5 is an exemplary block diagram showing the steps for compiling the images to an interactive environment.

FIG. 5 is an exemplary block diagram showing the steps for compiling 106 the finished files to an interactive environment. Within the step of compiling 106 the finished video file resulting from clarifying 105b and the finished photo file resulting from refining 105a are combined to be displayed in an interactive environment. A finished video file and a finished photo file may be collectively referenced as finished files. The step of compiling 106 comprises uploading 501, embedding 502, adding 503 point of interest icons, overlaying 504, and publishing 505.

Uploading 501 includes reframed video uploading 501a, photo uploading 501b, and non-reframed video uploading

501c. A finished video file may be non-reframed video or reframed video. A finished photo file may undergo photo uploading 501b. Uploading 501 is the step of transferring finished files that resulted from refining 105a and clarifying 105b to a hosting server. A hosting server is a server from which a viewer may access an interactive environment. The finished photo file resulting from the refining 105a may be displayed as the background of the interactive environment. Additional features, including reframed videos, viewer controls, and other features, may be overlayed.

Non-reframed video that undergoes non-reframed video uploading 501c does not need to go through the steps of embedding 502, adding 503, and overlaying 504. Non-reframed video is published to a server. Non-reframed publishing 505b is the publishing of non-reframed video. Non-reframed video, may for example, be used in a virtual reality device. Non-reframed video published for display may be considered a supplementary experience.

Publishing 505 is the final step in the compiling 106 step. Publishing is the act of allowing viewers access to the interactive environment. The compiled interactive environment may be comprised of the uploaded finished files, the background, and the embedded content. A hosting server may be connected to computers via the internet. The interactive environment may be distributed to any computer connected to the internet. Viewers may view the displayed interactive environment on a device. An alternative method of publishing 505 may be that the compiled interactive environment is loaded to a local storage media. The local storage media may be a SD card or a computer. The SD card in such embodiment may be physically delivered and accessed for display of the interactive environment. Publishing 505 includes both non-reframed publishing 505b and reframed publishing 505a. Reframed publishing 505a may be performed when publishing an interactive environment with finished video file as a reframed video. Non-reframed publishing 505b may be performed when publishing a non-reframed finished video file.

Embedding 502 is the function wherein a finished video file is attached to a spot on the photo displayed as the interactive environment's background. This spot is the location wherein an operator has selected as a frame of action. Multiple reframed videos may be attached to various spots on the photo. Multiple frames of action may be in one interactive environment. The reframed video may play when a viewer activates the reframed video. Embedding 502 a reframed video in an interactive environment including a stitched 360-degree photo is a novel and unique concept.

Adding 503 points of interest icons is the step of placing descriptive information at each point of interest selected by the operator. The added icons at the points of interest allow a viewer to be displayed additional information when an icon is clicked.

Overlaying 504 is the step of applying additional information over the top of the interactive environment. Additional information may include navigation, virtual reality mode, instructions, and interactive interview videos. Navigation may include menu buttons, a back button, links, and other similar items. Once the images have been uploaded, videos embedded, points of interest added, and additional information overlayed, the various elements are now considered a compiled interactive environment.

Reframed video that has undergone reframed video uploading 501a and has gone through the steps of embedding 502, adding 503, and overlaying 504 undergoes reframed publishing 505a. Reframed publishing 505a is the act of loading the compiled interactive environment to a server that viewers can access. A hosting server may be connected to computers via the internet. The interactive environment may be distributed to any computer connected to the internet. Viewers may view the displayed interactive environment on a device.

The availability of both published non-reframed video for a supplemental experience using virtual reality, and an interactive environment including reframed video in one or more frames of action, both from the recording 103 of a 360-degree video, is a new and unique concept.

The interactive environment may be displayed on a variety of devices. Displaying the interactive environment is when a viewer may access the interactive environment on a device. Devices may include: smart boards, desktop computers, laptops, touch screen tablets, mobile phones, mobile phones fitted with virtual reality glasses, and wearable devices like dedicated virtual reality headsets and dedicated augmented reality headsets. Viewers may use the devices to interact with the interactive environment. For example, a viewer could use a virtual reality device to view the interactive environment. In addition, a virtual reality device could allow for the user to physically walk around, navigate the interactive environment, and activate embedded reframed videos and points of interest.

Explanation of Exemplary Language

While various inventive aspects, concepts and features of the general inventive concepts are described and illustrated herein in the context of various exemplary embodiments, these various aspects, concepts and features may be used in many alternative embodiments, either individually or in various combinations and sub-combinations thereof.

Unless expressly excluded herein all such combinations and sub-combinations are intended to be within the scope of the general inventive concepts. Still further, while various alternative embodiments as to the various aspects, concepts and features of the inventions (such as alternative materials, structures, configurations, methods, devices and components, alternatives as to form, fit and function, and so on) may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the general inventive concepts even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. A method for displaying 360-degree virtual reality video on a non-virtual reality device comprising:
identifying a location chosen by an operator-comprising determining a point of interest at the location and picking a frame of action at the location, the location is such that the point of interest and the frame of action are captured with a camera at the location, the point of interest to be accessible by a viewer in an interactive environment on a non-virtual reality device;
recording a 360-degree video of the frame of action at the location, the 360-degree video of the frame of action provides content beyond 360-degree photos of the point of interest, a first camera is used for shooting both the 360-degree photos of the point of interest and used for recording the 360-degree video of the frame of action;
shooting one or more 360-degree photos of the point of interest at the location, the shooting comprising extracting a singular still image frame from the 360-degree video which serves as a background where a reframed, standard aspect ratio video is re-inserted;
refining the 360-degree photos into a finished photo file, the refining comprising utilizing photo sorting to sort the 360-degree photos then subsequently photo stitching to derive an equirectangular photo, the equirectangular photo adjusted to result in the finished photo file;
clarifying the 360-degree video into a finished 360-degree video file, the clarifying comprising video sorting, video stitching, video adjusting, and reframing,
wherein the video sorting comprises sorting of the 360-degree video to subsequently undergo the video stitching,
wherein the video stitching comprises stitching to derive an equirectangular video, the equirectangular video then undergoes the video adjusting,
wherein the video adjusting results in the finished 360-degree video file,
wherein the reframing comprises manipulating the finished 360-degree video file into a standard aspect ratio video for displaying in the interactive environment viewable on the non-virtual reality device by manually moving a virtual camera via a video editing software to limit the viewable area to follow a chosen visual action such that the limited viewable area is exported as a standard aspect ratio video; and
compiling the finished video file and the finished photo file, the finished video file and the finished photo file combined for display in the interactive environment, the compiling comprising uploading, embedding, overlaying, and publishing,
wherein the uploading comprises uploading the finished video file and the finished photo file to a hosting server, the finished photo file being displayed as a background to the interactive environment,
wherein the embedding comprises the finished video file being embedded to a particular spot on the background, the particular spot being the location of the frame of action to provide more information about content communicated in the interactive environment,
wherein the overlaying comprises overlaying additional information in the interactive environment, the point of interest identifiable by the viewer interacting with the interactive environment as a selectable space of content in the interactive environment,
wherein the publishing comprises allowing the viewer access to the interactive environment on the non-virtual reality device such that the interactive environment is displayed as 360-degree photos upon which standard aspect ratio videos originating from the 360-degree videos are displayed.

2. A method for displaying 360-degree virtual reality video on a non-virtual reality device comprising:
identifying a location chosen by an operator comprising determining a point of interest at the location and picking a frame of action at the location to be provided in relation to the point of interest, the location is such that the point of interest and the frame of action are captured with a camera at the location, the point of interest to be accessible by a viewer in an interactive environment on a non-virtual reality device;
recording a 360-degree video of the frame of action at the location; and
clarifying the 360-degree video into a finished 360-degree video file, the clarifying comprising video sorting wherein the 360-degree video is sorted to subsequently undergo video stitching to derive an equirectangular video, the equirectangular video then undergoing video adjusting which results in the finished 360-degree video file, and
reframing the finished 360-degree video file wherein the reframing comprises manipulating the finished 360-degree video file into a standard aspect ratio video for displaying in the interactive environment viewable on the non-virtual reality device by manually moving a virtual camera via a video editing software to limit the viewable area to follow a chosen visual action such that the limited viewable area is exported as a standard aspect ratio video.

3. The method of claim 2, wherein the location is at a place of work.

4. The method of claim 2, wherein the clarifying is further comprised of organizing multiple equirectangular videos into a storyboard sequence of the frame of action at the location.

5. The method of claim 2, further comprising more than one frame of action.

6. The method of claim 2, further comprising shooting one or more 360-degree photos of the point of interest at the location.

7. The method of claim 6, wherein the 360-degree video of the frame of action provides content beyond the 360-degree photos of the point of interest.

8. The method of claim 6, further comprising refining the 360-degree photos into a finished photo file, the refining comprising photo sorting wherein the 360-degree photos are sorted to subsequently undergo photo stitching to derive an equirectangular photo, the equirectangular photo adjusted to result in the finished photo file.

9. The method of claim 8, further comprising compiling the finished video file and the finished photo file, the finished video file and the finished photo file combined to be displayed in the interactive environment, the compiling comprising uploading, embedding, and publishing,
wherein the uploading comprises uploading the finished video file and the finished photo file to a hosting server, the finished photo file displayed as a background to the interactive environment,
wherein the embedding comprises the finished video file being embedded to a particular spot on the background,
wherein publishing comprises allowing the viewer access to the interactive environment.

10. The method of claim 6, wherein the shooting comprises extracting a singular still image frame from the 360-degree video which serves as a background where the reframed, standard aspect ratio video is re-inserted.

11. The method of claim 7, wherein a first camera is used for shooting both the 360-degree photos of the point of interest and used for recording the 360-degree video of the frame of action.

12. The method of claim 11, wherein the first camera simultaneously performs shooting and recording functions.

13. The method of claim 7, wherein a first camera is used for shooting the 360-degree photos of the point of interest at the location and a second camera is used for recording the 360-degree video of the frame of action at the location.

14. The method of claim 2, further comprising:
compiling the finished video file, wherein compiling comprises embedding, overlaying, and publishing,
wherein the embedding comprises the finished video file being embedded to a particular spot on a background to the interactive environment, the spot being the location of the frame of action to provide more information about content communicated in the interactive environment,
wherein the overlaying comprises overlaying additional information in the interactive environment, the point of interest identifiable by the viewer interacting with the interactive environment as a selectable space of content in the interactive environment,
wherein the publishing comprises allowing the viewer access to the interactive environment on the non-virtual reality device such that the interactive environment is displayed as a 360-degree photos upon which standard aspect ratio videos originating from the 360-degree videos are displayed.

15. The method of claim 14, wherein a finished photo file is displayed as the background to the interactive environment, the finished video file embedded to a particular spot on the background as the point of interest, the point of interest is where a viewer may interact to access the additional information.

16. The method of claim 15, wherein the finished photo file is displayed as the background to the interactive environment, the finished video file embedded to a particular spot on the background as the point of interest, the point of interest is selectable by a user interacting with the interactive environment.

17. The method of claim 16, wherein the frame of action provides a pop-out window beyond the point of interest.

18. The method of claim 17, wherein the frame of action is an area on the 360-degree photos.

19. The method of claim 18, wherein the frame of action provides text, images, or video.

20. The method of claim 18, wherein the frame of action provides more information about content communicated in the interactive environment.

21. The method of claim 18, wherein the frame of action is provided in relation to the point of interest.

22. The method of claim 18, wherein the point of interest is shot as a 360-degree photos and the frame of action is recorded as a 360-degree video.

23. The method of claim 22, wherein the 360-degree video of the frame of action provides content beyond the 360-degree photos of the point of interest.

24. The method of claim 18, further comprising extracting one or more 360-degree photos of the point of interest at the location from the 360-degree video of the frame of action.

25. The method of claim 1, wherein photo stitching comprises combining 360-degree photos into a 360-degree equirectangular format.

26. The method of claim 25, wherein the frame of action provides a pop-out window beyond the point of interest, the frame of action is an area on the 360-degree photos provided in relation to the point of interest.

* * * * *